United States Patent [19]

Meynier

[11] Patent Number: 4,540,067
[45] Date of Patent: Sep. 10, 1985

[54] BRAKING SYSTEM INCORPORATING AT LEAST ONE SLIDING BRAKE DISC AND BRAKE DISC FOR SUCH A BRAKING SYSTEM

[75] Inventor: Guy Meynier, Aulnay S/Bois, France

[73] Assignee: Societe Anonyme D.B.A., Paris, France

[21] Appl. No.: 580,485

[22] Filed: Feb. 15, 1984

[30] Foreign Application Priority Data

Feb. 25, 1983 [FR] France ................ 83 03134

[51] Int. Cl.³ .............. F16D 55/36; F16D 65/54
[52] U.S. Cl. ................. 188/71.5; 188/71.8; 188/72.3; 188/196 P; 188/216; 192/70.25; 192/111 A
[58] Field of Search ............ 188/18 A, 71.5, 71.8, 188/72.3, 196 P, 216; 192/70.21, 70.25, 70.28, 111 A

[56] References Cited

U.S. PATENT DOCUMENTS

| | | | |
|---|---|---|---|
| 2,985,259 | 5/1961 | Gardner | 188/71.5 |
| 2,997,138 | 8/1961 | Cagle | 188/71.8 |
| 3,702,651 | 11/1972 | Fujita et al. | 192/70.25 |
| 3,707,207 | 12/1972 | Kondo | 188/71.5 |
| 4,371,059 | 2/1983 | Seki | 188/71.8 |

FOREIGN PATENT DOCUMENTS

| | | |
|---|---|---|
| 2517317 | 10/1976 | Fed. Rep. of Germany . |
| 1319456 | 1/1963 | France . |
| 2425581 | 12/1979 | France . |
| 583596 | 12/1946 | United Kingdom . |
| 1087988 | 10/1967 | United Kingdom . |
| 2049845 | 12/1980 | United Kingdom . |

Primary Examiner—George E. A. Halvosa
Assistant Examiner—Richard R. Diefendorf
Attorney, Agent, or Firm—Larry J. Palguta; Ken C. Decker

[57] ABSTRACT

The braking system incorporates at least one brake disc (36) sliding on a rotating driving component (22) capable of being braked by way of friction components (44, 50). The sliding disc (36) is provided with a device for returning and memorizing a position (60) enabling the disc to be always at the same predetermined distance relative to one of the friction components (44) when the brake is not applied, irrespective of the state of wear of the friction component (44). Applicable to motor vehicle braking systems.

5 Claims, 6 Drawing Figures

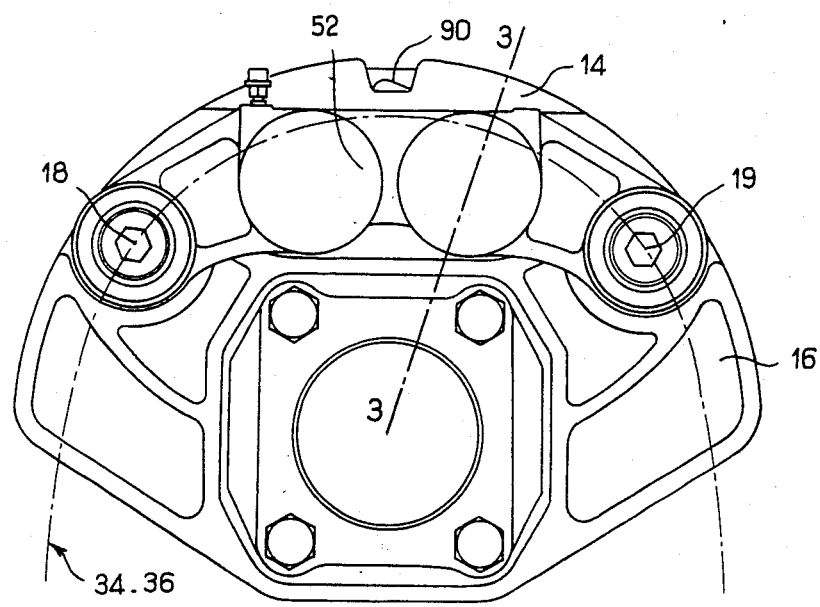
FIG_1
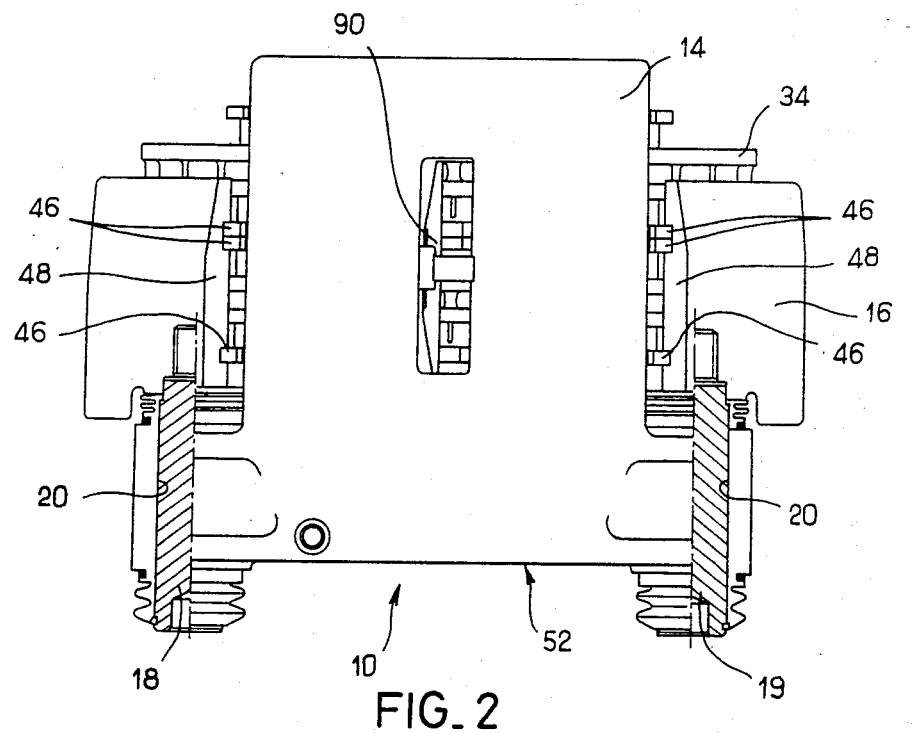
FIG_2

BRAKING SYSTEM INCORPORATING AT LEAST ONE SLIDING BRAKE DISC AND BRAKE DISC FOR SUCH A BRAKING SYSTEM

The subject of the invention is a braking system incorporating at least one brake disc sliding axially on a rotating splined driving component, particularly for motor vehicles, and a brake disc for such a braking system.

The invention concerns in particular a braking system of the disc brake type in which the caliper incorporates a brake actuator capable of causing directly the frictional engagement of a friction component against a first surface of a rotating disc and of causing indirectly the frictional engagement of a second friction component through the disc sliding on a rotating splined driving component.

A system of braking is known from U.S. Pat. No. 2,985,259 of the type defined above, in which a fixed caliper houses three friction components so that they are anchored and able to slide, between which components sliding discs are interposed on a rotating driving component. In this type of braking system, in particular when it is intended for heavy vehicles, the sliding disc must provide the necessary braking capacity and the corresponding heat dissipation. This results in the sliding disc being bulky and heavy. As a consequence of the weight of the disc, there is a risk that it will slide on the driving shaft when the vehicle negotiates a bend or when it is subjected to vibrations due to a poor road surface. This disc movement can cause undesirable braking due to the application of the disc onto the friction component corresponding to the direction of disc movement. In addition, the disc is capable of pushing back the hydraulic brake actuator piston and in consequence causing an increase in the travel of the brake pedal, an increase which can go as far as a loss of braking. A solution to this problem has been proposed in French patent application No. 79/12,003 published under No. 2,425,581. This solution proposes a sprag device preventing the movement of the disc towards the brake piston and hence avoiding the problems of lengthened pedal travel mentioned above. This solution has nevertheless two major disadvantages; firstly nothing prevents the disc from moving in the direction away from the piston and thus applying itself against the other friction component, thereby causing undesirable braking, and also the knuckle, preventing the return of the disc, maintains this undesirable braking for as long as the friction lining shows no additional wear, releasing the disc; secondly during the changing of the friction components the sprag prevents the free movement of the disc and requires a special tool enabling the sprag clutch to be rendered inoperative.

The subject of the invention is a braking system in which such disadvantages are overcome.

With this aim the invention proposes a braking system incorporating at least one brake disc capable of being braked by means of friction components, said disc being mounted so as to slide axially on a rotating driving component characterized in that said disc incorporates a device for returning and for memorizing a position, enabling said disc to be always at the same predetermined distance relative to one of the friction components, when the brake is not applied, irrespective of the state of wear of said friction component.

It is thus apparent, owing to the invention, that firstly, the disc incorporates a device for memorizing a position, preventing the latter from pushing back the piston and thus causing loss of pedal travel, and secondly, the disc incorporates a return device preventing the disc from being in frictional engagement with the friction component on the opposite side from the piston, when the brake is not applied, in order to prevent any undesirable braking.

Another subject of the invention consists of using the sliding disc incorporating the device for returning and memorizing in association with a second fixed disc, the caliper being a sliding caliper and the sliding disc being positioned on the same side as the brake actuator of the caliper so as to limit the movement of the sliding caliper as the wear of the friction components progresses.

A third subject of the invention consists in making the sliding disc movable from its splined shaft with its device for returning and memorizing which remains firmly fixed to the disc itself, even when the latter is removed from its splined shaft thus enabling an assembly to be removable as a unit.

A description follows of a preferred embodiment of the invention, by way of an example which is not limiting, with reference to the accompanying drawings, in which:

FIG. 1 is an end view of a braking system according to the invention;

FIG. 2 is a plan view of the braking system shown in FIG. 1 in which certain portions are shown in section;

Figure 3:
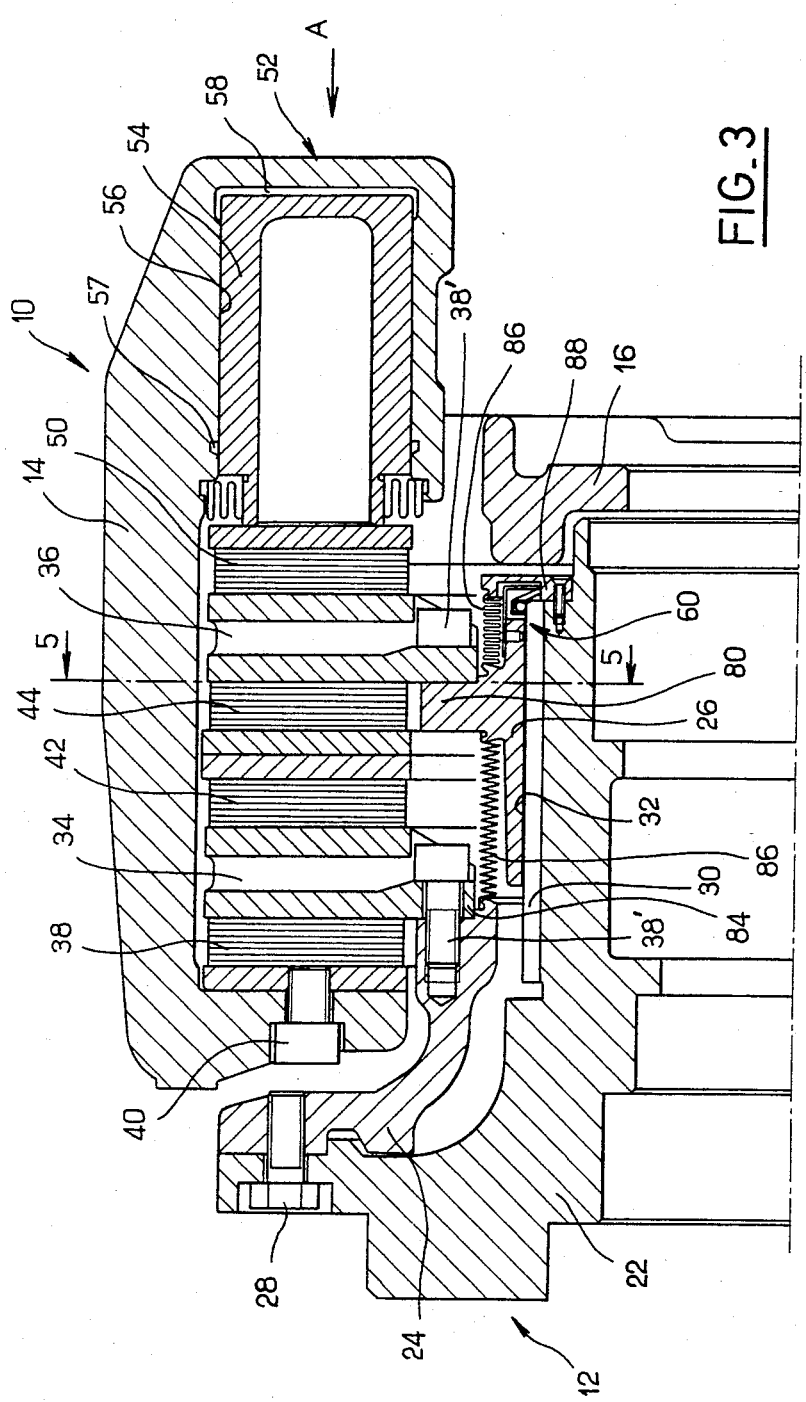
FIG. 3 is a sectional view along the line 3—3 of the braking system shown in FIG. 1.

The braking system shown in FIGS. 1, 2 and 3 consists of a disc brake given the general reference 10 and a rotating assembly given the general reference 12. The disc brake 10 incorporates, in a conventional way, a caliper 14 mounted so as to slide on a fixed support 16 by means of two axial pins 18 and 19 fixed in the fixed support 16 and passing through bores 20 formed in the caliper 14. In a conventional way the fixed support 16 is joined to a fixed part of the vehicle (not shown).

The rotating assembly 12 is joined to a wheel of the vehicle (not shown). This rotating assembly 12 incorporates a wheel hub 22 which carries a fixed disc hub 24 and a sliding disc hub 26. The fixed hub 24 is linked in rotation and in translation to the hub 22 with the aid of screws 28 spaced circumferentially. The sliding hub 26 is firmly fixed in rotation to the hub 22 owing to splines 30 formed on the hub 22 and entering into grooves 32 formed in the hub 26. The sliding hub 26 is capable of moving axially along the splines 30. Each of the hubs 24 and 26 carries a brake disc, 34 and 36 respectively, fixed to the corresponding hub by means of screws 38'.

The brake 10 incorporates friction components positioned between the discs 34 and 36. More precisely, the disc brake 10 incorporates 4 friction components, a first friction component 38 being fixed to the caliper 14 by means of screws 40. A second and third friction component, 42 and 44 respectively, are positioned back-to-back between the discs 34 and 36 and are supported by lugs 46 on the sliding surfaces 48 formed on the fixed support 16. Finally a fourth friction component 50 is positioned between the disc 36 and a brake actuator 52 firmly fixed to the caliper. The friction component 50 is also supported by the sliding surfaces 48 of the fixed support 16 by means of lugs 46 in a manner similar to that of the friction components 42 and 44. In the embodiment shown the brake actuator 52 is double, each half incorporating a piston 54 mounted so as to slide in a bore 56 formed in the caliper 14, the piston 54 being sensitive to pressure existing in a chamber 58 capable of being connected to a source of hydraulic pressure such as, for example, the master cylinder of the vehicle (not shown).

Figure 4:
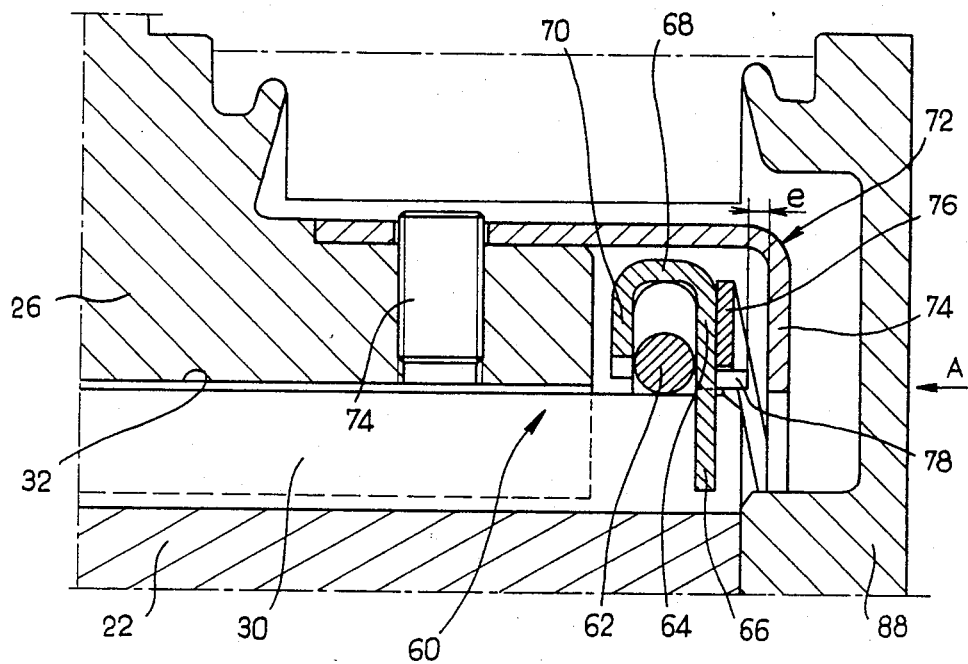
FIG. 4 is a partial enlarged view of the device for returning and memorizing shown in FIG. 3.

According to the invention the braking system incorporates a device for returning and for memorizing a position, given the general reference 60, positioned at one end of the sliding hub 26. Referring to FIG. 4 in which the device for returning and for memorizing 60 is shown enlarged, it is seen that the latter incorporates an annular undulating spring 62 mounted in frictional engagement on the splines 30 of the hub 22, the annular spring being retained axially by a cage 64, the assembly of the spring 62 and the cage 64 forming a friction ring. The cage 64 incorporates tongues 66 which enter the grooves of the hub 22 so as to be firmly fixed in rotation to the hub 22 but able to move axially relative to the latter. The cage 64 also incorporates a followed portion 68 which not only retains the undulating spring radially and provides the preloading on the splines but also retains the latter axially by means of a second series of tongues 70. The device 60 also incorporates a sleeve 72 firmly fixed to the hub 26, and therefore to the disc 36, by means of at least one screw 74. This sleeve forms a portion firmly fixed to the disc. As is seen in FIG. 4, this sleeve 72 incorporates a portion 74 which is folded down radially. Positioned between this portion 74 and the cage 64 is an annular undulating spring bearing alternately on the cage 64 and the portion folded down 74 so as to push apart the latter components, this spring 76 forming the elastic component which pushes apart the cage 64 and the portion 72 firmly fixed to the disc 36. The cage 64 also incorporates a third series of tongues 78 folded back axially to the right, referring to FIG. 4, which define a distance e between the friction ring assembly and the portion firmly fixed to the disc 36. This distance e is predetermined by means of the length of the tongues 78. According to the invention, the axial force of the spring 76 is imperatively less than the axial drag generated by the frictional engagement of the annular spring 62 on the splines 30 so that the sleeve 72 only drives the cage 64 and the spring 62 until the distance e becomes nil, that is to say, when the portion folded back 74 comes into contact with the tongues 78.

Figure 5:
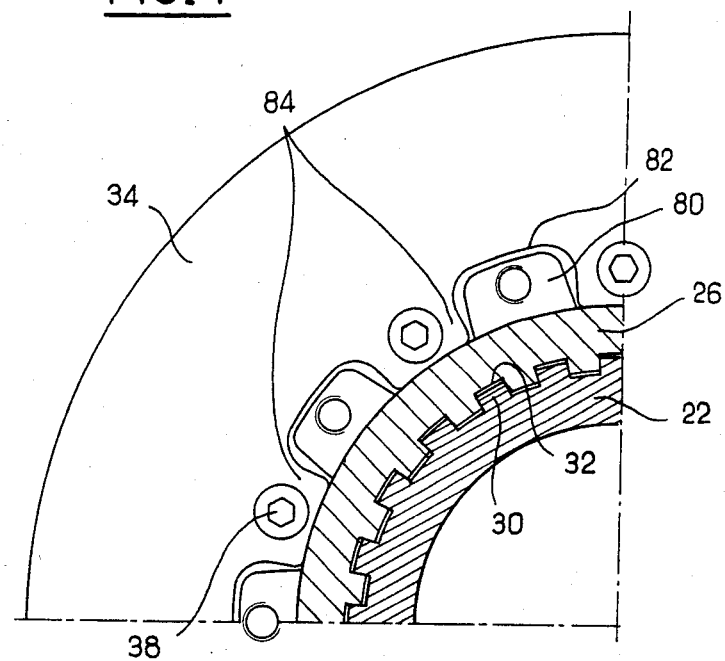
FIG. 5 is a partially sectioned view along the line 5—5 in FIG. 3, the caliper and the friction components having been removed.

Referring to FIG. 5 it is seen that the sliding hub 26 has tapped lugs 80 in which are mounted the screws 38' for fixing the disc 36. The disc 34 has a series of slots 82 and a series of lugs 84, the slots 82 being larger than the lugs 80 of the hub 26 and the lugs 84 being positioned between two adjacent slots 82 and enabling the disc 34 to be mounted on the hub 24 by means of screws 38'. Referring to FIG. 3 it is seen that protective bellows 86 have been mounted between the hubs 24 and 26, and also between the hub 26 and a portion 88 firmly fixed to the hub 22.

Finally, referring to FIG. 2 it is seen that a spring 90 positioned on the caliper 14 pushes the friction components 42, 44 and 50 radially against the sliding surfaces 48 carried by the fixed support 16.

Figure 6:
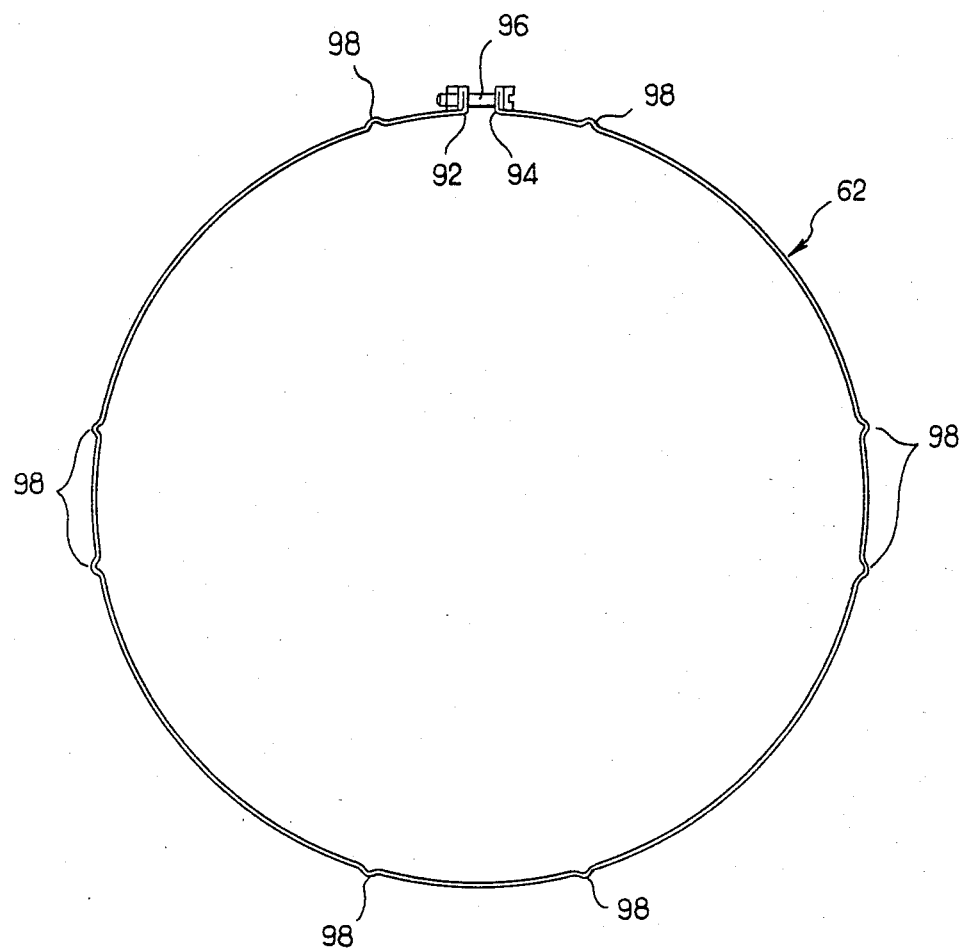
FIG. 6 is an enlarged axial view of another embodiment of the annular friction spring.

Referring to FIG. 6 which shows another embodiment of the undulating friction spring 62 it is seen that the spring 62 is made from a strip of metal whose ends 92 and 94 are folded radially outwards so that a bolt 96 may be positioned between these two ends, enabling the friction desired on the splines 30 to be adjusted. The metal strip has local undulations 98 enabling a circumferential elasticity to be provided which maintains the friction essentially constant after adjusting the latter, and as in the preceding embodiment this spring 62 is positioned in the cage 64.

The brake described above with the aid of FIGS. 1 to 6 operates in the following manner:

When liquid under pressure is admitted to the chamber 58 the piston 54 moves in the direction of the arrow A in FIG. 3 relative to the caliper 14. The piston 54 applies the friction component 50 onto the disc 36. Under the effect of being pushed by the piston 54, the latter also moves in the direction of the arrow A against the spring 76. The disc 36 moves the friction components 44 to 42 also in the direction of the arrow A until the friction component 42 comes to bear against the fixed disc 34. By reaction, the caliper 14 moves in the direction opposite to that of the arrow A and applies the friction component 38 onto the other surface of the disc 34, the caliper being able to slide on pins 18 and 19. As long as the displacement of the disc 44 remains less than the amount e existing between the cage 64 and the sleeve 72, the spring 62 and the cage 64 remain immobile. When the brake is released, that is to say when the pressure in the chamber 58 decreases, the seal 57 of the piston 54 causes the piston 54 to return, in a conventional manner, in the opposite direction to that of the arrow A, by a known amount, the disc 36 pushed by the spring 76 through the sleeve 72 is pushed back to the right referring to FIG. 3 until the play e is established once again. The disc 36 thus moves away from the disc 34 and the friction component 44 by a known amount which corresponds to the amount e.

If during subsequent braking the wear of the friction components 42 and 44 is such that the portion folded back 74 comes into contact with the tongues 78, the friction ring assembly consisting of the spring 62 and the cage 64 moves in the direction of the arrow A (see FIG. 4) by an amount equal to the wear of the components 42 and 44 which must be recovered. When the braking is released the spring 76 once again pushes the disc by an amount e in the opposite direction to that of the arrow A but starting from a new position of the cage 64 to which it has progressed in the direction of the arrow A. Thus when the brake is not applied a constant play is maintained between the discs 36 and 34, the seal 57 also providing play between the friction components 38 and 50 which enables all residual torques on the four friction components to be eliminated.

The mounting of the braking system described above is carried out in the following manner:

The vehicle is equipped beforehand with the fixed support 16 mounted on a fixed part of the vehicle (not shown). The procedure continues with the mounting of the device for returning and for memorizing a position onto the sliding hub 26. For this the spring 62 is mounted in the cage 64 and then positioned on the end of the sliding hub 26. The spring 76 is put into position which is then covered by the sleeve 72 which is then mounted on the end of the hub 26. The screw 74 is put into position so as to immobilize the sleeve 72 relative to the hub 26. The procedure continues with the assembling of the rotating assembly 12. The hub 22 is equipped with the fixed hub 24 by means of screws 28. The grooves 32 of the hub 26 are then brought to face the splines 30 of the hub 22. By moving the hub 26 in the direction of the arrow A in FIG. 3 relative to the hub 22, the splines 30 are entered until the latter come close to the cage 64 and the spring 62. By ensuring that the tongues 66 are properly positioned between these splines 30, the hub 26 can be moved further along the splines 30, the spring 62 then mounts onto the splines 30 and as it is held between the splines 30 and the portion 68 of the cage 64 the spring is constrained and provides a frictional engagement with the splines 30. The hub 26 is then placed in the desired initial position. The procedure continues with the positioning of the protective covers 86, firstly between the hubs 24 and 26 and secondly between the hub 26 and the component 88 firmly fixed to the hub 22. The procedure continues with the mounting of the disc 34. Referring to FIGS. 3 and 5, it is seen that the disc 34 can pass axially over the hub 26 owing to the slots 82. By ensuring that the slots 82 are properly positioned facing the projections 81 of the hub 26, the disc 34 is moved in the direction of the arrow A in FIG. 3 until it comes to bear against the hub 24 and the procedure continues with the mounting of the screws 38' to fix the disc 34 to the hub 24. The disc 36 is then positioned on the projections 80 and is fixed to the hub 26 by means of screws 38'. The rotating assembly 12 can then be placed in position on the vehicle, in a conventional manner, on the stub axle (not shown).

The procedure continues with the mounting of the brake. The friction components 42, 44 and 50 are positioned close to the discs 34 and 36 and are supported by their lugs 46 on the sliding surfaces 48 of the fixed support 16. The caliper 14, equipped beforehand with its brake actuator and the friction component 38 screwed to this caliper by means of screws 40, is then brought into position radially so as to straddle the two discs 34 and 36. The procedure continues with the mounting of the pins 18 and 19 by entering them into the bores 20 in the caliper 14 and then screwing them into the fixed support 16 by means of threads provided for this purpose.

The operation of dismantling the braking system is carried out in the reverse order of the operations which are described above.

The procedure for replacing the friction components is as follows:

One of the pins 18 or 19 is unscrewed and then the caliper is free to swivel about the remaining pin and access is obtained to the friction components 42, 44 and 50 which remain on the fixed support 16, by unscrewing the screws 40 the friction component 38 is also removed. The sliding hub 26 is then moved in the direction opposite to that of the arrow A in FIG. 3 to enable new friction components 42 and 44 to be placed in position. To move the hub 26, the frictional force of the spring 62 on the splines 30 must be overcome, which is easily done by pulling on the disc 36 in the direction opposite to that of the arrow A, the right-hand end, referring to FIG. 3, of the hub 26 coming to bear against the cage 64; it is then sufficient to pull on the disc 36 with a force greater than the frictional force of the spring 62 on the splines 30. When all the friction components have been replaced and the piston 54 pushed to the bottom of its bore 56, the caliper 14 may once again be swivelled and the pin which had been removed may be replaced in position.

As is understood from the above description, if the discs 34 and 36 must be replaced as a result of wear, it is not necessary to dismantle the hub 26 from the hub 22. It is sufficient to remove the screws 38' and the discs 34 and 36 can be dismantled with no risk of contaminating the sliding zone of the hub 26. In the same way, if the hub assembly 26 and the disc 36 must be removed from the hub 22, it is not necessary to dismantle the device for returning and for memorizing a position 60; the latter remains firmly fixed to the hub 26 and there is no risk of it being mislaid or damaged.

Referring to FIG. 3, it may be seen that the sliding disc 36 and its hub 26 are positioned on the same side as the brake actuator 52. This arrangement enables the movement of the caliper 14, in the direction opposite to that of the arrow A, to be limited. In fact the caliper 14 only moves by the amount of the thickness of the lining to be worn away on the friction component 38. Wear of the components 42 and 44 is compensated by movement of the disc 36 in the direction of the arrow A, the disc 36 and its hub 26 remaining within the space defined by the hub 22. This arrangement enables the length of the pins 18 and 19 to be limited as well as the risks of interference between the caliper 14 and other parts of the vehicle (not shown) when the linings are worn.

Obviously the invention is not limited to the embodiments shown, in particular several sliding discs may be provided, and any other form of friction ring, without thereby departing from the framework of the invention.

I claim:

1. A braking system incorporating at least one brake disc capable of being braked by means of friction components, said disc being mounted to slide axially on and rotate with a rotating component, characterized in that the disc includes a device for returning and for memorizing a position and which enables the disc to be always at a predetermined distance relative to one of the friction components when the brake is not applied, irrespective of the wear of said one friction component, the device for returning and for memorizing including a friction ring cooperating with said rotating component and an elastic component which pushes apart said friction ring and a portion fixed firmly to said disc, the elastic component comprising spring means that allows, between said portion and said friction ring, a limited relative axial movement for the predetermined distance beyond which the portion axially displaces said ring, the friction ring comprising a cage retaining axially an annular spring mounted in frictional engagement in splines of said rotating component, and said portion comprising a sleeve fixed firmly to said disc and having a radially folded portion to retain between the radially folded portion and cage the spring means which comprises an undulating washer.

2. The brake system in accordance with claim 1, characterized in that said friction ring generates an axial drag greater than the axial force generated by said elastic component.

3. The braking system in accordance with claim 2, characterized in that projections are integral with said cage to limit the relative axial movement between the radially folded portion and cage and provide for the axial displacement, beyond the predetermined distance, of said cage by the radially folded portion.

4. The braking system in accordance with claim 1, characterized in that the system includes an axially fixed disc and the axially sliding disc, a brake with a sliding caliper capable of pushing said friction components into frictional engagement with said discs and the sliding disc being positioned on the same axial side of the caliper as a brake actuator in order to limit axial movement of the caliper as the wear of the friction components progresses.

5. The braking system in accordance with claim 1, characterized in that the device for returning and for memorizing is positioned at one end of a splined sliding hub supporting said disc and is fixed rotationally to the splined sliding hub, the device for returning and for memorizing remaining positioned on said splined sliding hub when the splined sliding hub and disc are separated from said rotating component.

* * * * *